E. T. BATES.
NUT LOCK.
APPLICATION FILED MAY 9, 1912. RENEWED NOV. 11, 1914.

1,143,247.

Patented June 15, 1915.

Witnesses:

Inventor:
E. T. Bates.
By D. L. Reindl
Atty

UNITED STATES PATENT OFFICE.

EDWARD T. BATES, OF WASHINGTON, DISTRICT OF COLUMBIA.

NUT-LOCK.

1,143,247.   Specification of Letters Patent.   Patented June 15, 1915.

Application filed May 9, 1912, Serial No. 696,127.   Renewed November 11, 1914.   Serial No. 871,632.

*To all whom it may concern:*

Be it known that I, EDWARD T. BATES, a citizen of the United States, residing at Washington, in the District of Columbia, have invented certain new and useful Improvements in Nut-Locks; and I do hereby declare the following to be a full, clear, and exact description of the invention, such as will enable others skilled in the art to which it appertains to make and use the same.

My invention relates to nut-locks, has for its object a simple, cheap and effective device for locking or securing a nut against unintentional loosening, displacement, or detachment from the bolt, and the invention consists in a certain novel attachment or improvement to be applied to the conventional nuts in common use with bolts without making any change in the nut, as will be fully disclosed in the following specification and claims.

Figure 1:
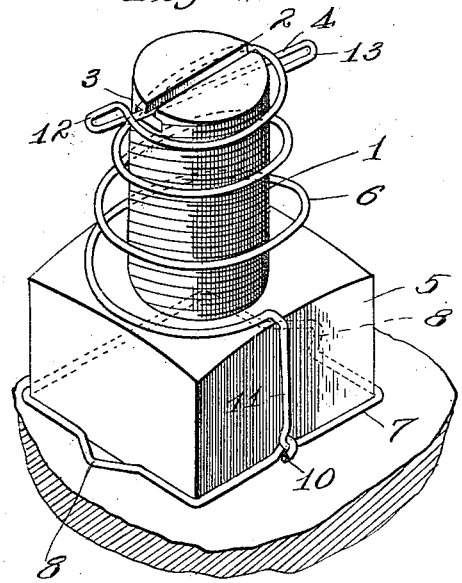
Figure 2:
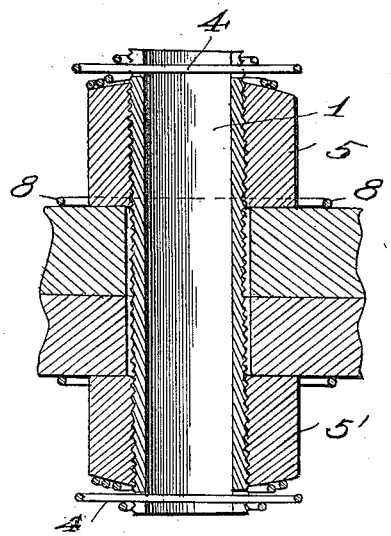
Figure 3:
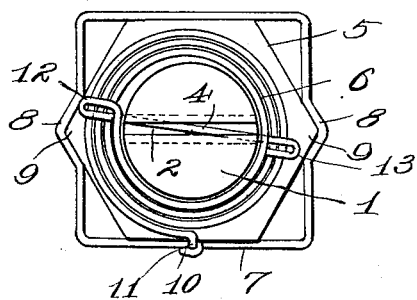

In the accompanying drawings which form part of this specification:—Figure 1 is a perspective showing my improved nut lock applied to a bolt and nut, the helices of the lock being distended. Fig. 2 is a vertical transverse section partly in elevation, showing a tubular bolt and the helices of the lock contracted. Fig. 3 is a top plan view showing the lock applied to a hexagonal nut, and Fig. 4 is a side elevation showing a modified form of locking member.

Reference being had to the drawings and the designating characters thereon, the numeral 1 indicates a screw threaded bolt having a transverse slot 2 in the end thereof, and the slot undercut to form overhanging shoulders as 3, 3, to prevent the bar 4 (when under tension) of the locking member becoming disengaged from the bolt.

The bolt may be tubular with a flange or head 5' at one end, which may be integral therewith like an ordinary bolt head, or the head may be separate from the bolt and secured by a screw thread, as shown in Fig. 2.

Figure 4:
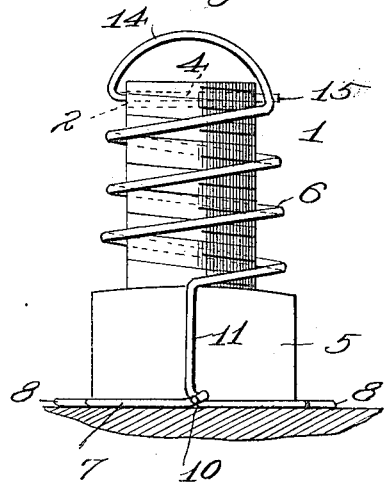

The nut 5 is of conventional form and may be of any shape commonly used, square as shown in Figs. 1, 2 and 4, hexagonal, as shown in Fig. 3, or of any preferred form.

The locking member 6 made of tempered steel wire is helically coiled, preferably conical and resilient, capable of having pressure or torsion applied thereto and is provided at its inner end with a loop 7, or a constituent portion of such loop, which conforms to and engages the exterior of the nut 5, of whatever shape it may be, and on opposite sides of the loop are recesses 8, 8, which accommodate the corners 9, 9, of a hexagonal nut. One end of the loop is bent around and may be secured to the vertical arm 11, as shown in Figs. 1, 3 and 4.

The arm 11 is preferably of a length nearly equal to the thickness of the nut, and is preferably at a right angle to the plane of the loop 7, and from its upper end the member is coiled helically and preferably conically into about three and a half coils, but a less or greater number of coils may be used, and is then bent into a loop 12 and the bar 4 extended transversely and may be carried under the upper helix or turn of the coil, as shown in Fig. 3.

The free end of the bar 4 is bent upon itself at 13, and it and the loop 12 form means for twisting the helices and applying tension or torsion thereto and for inserting the bar 4 in the slot 2. The tension or torsion on the helices is sufficient to lock the nut 5 against turning axially on the bolt 1, and securely locks the nut in position on the bolt holding it locked under tension.

In Fig. 4 is shown a modification of the outer end of the locking member 6. In this modified form the end of the member is formed into a loop 14 and the bar 4 is bent at its free end to form a bearing 15 at the end of the upper helix as shown in Fig. 4.

In applying tension or torsion to the helices of the member 6, the outer end thereof is seized between the thumb and the fore finger, or by a suitable implement, and the helices twisted or turned axially until the bar 4 registers or is in alinement with the slot 2 in the end of the bolt, when the bar 4 is pushed or forced into the slot until the bar enters or engages the undercut portion of the slot, when the member is released and the bar 4 instantly engages the wall of the undercut portion on opposite sides at the ends of the slot, as shown in Fig. 3.

The locking member 6 detached from the bolt and nut and in its normal position or condition represents a helically coiled truncated cone, with a loop at its base and a transverse bar at its apex, is made of suitable tempered wire, is simple in construction, effective, durable, easily applied and removed when desired, and is capable of being manufactured at small cost.

It will be observed that no change whatever is required in the conventional nuts in universal use and that the locking member may be applied to square or hexagonal nuts of different styles in any predetermined size of bolt and nut.

It is obvious that the end of the loop 7 may be left detached at 10 from the body thereof or may be continued only part way around the nut, so long as the arm engages one or more of the angular corners of the nut, without sacrificing its effectiveness.

Having thus fully described my invention, what I claim is;—

1. A nut-lock comprising a bolt having an undercut transverse slot in its outer end forming opposite overhanging retaining members, a nut, and a helically coiled member engaging the sides of the nut and having a transverse bar at its outer end adapted to enter said slot and engage said retaining members on opposite sides of the slot at the ends thereof and provided with means for putting the helices under tension.

2. A nut-lock comprising a bolt externally screw-threaded throughout its length, and provided with transverse undercut slots at both ends, adjustable nuts at both ends thereof, and a helically coiled spring engaging each nut on the sides thereof, and the undercut walls of the slots in the bolt.

In testimony whereof I affix my signature, in presence of two witnesses.

EDWARD T. BATES.

Witnesses:
D. C. REINOHL,
W. PARKER REINOHL.

Copies of this patent may be obtained for five cents each, by addressing the "Commissioner of Patents, Washington, D. C."